(12) United States Patent
Björkengren

(10) Patent No.: US 10,955,856 B2
(45) Date of Patent: Mar. 23, 2021

(54) METHOD AND SYSTEM FOR GUIDING AN AUTONOMOUS VEHICLE

(71) Applicant: Volvo Car Corporation, Gothenburg (SE)

(72) Inventor: Ulf Björkengren, Bjärred (SE)

(73) Assignee: Volvo Car Corporation, Gothenburg (SE)

( * ) Notice: Subject to any disclaimer, the term of this patent is extended or adjusted under 35 U.S.C. 154(b) by 65 days.

(21) Appl. No.: 16/135,083

(22) Filed: Sep. 19, 2018

(65) Prior Publication Data
US 2019/0113934 A1 Apr. 18, 2019

(30) Foreign Application Priority Data
Oct. 12, 2017 (EP) .................................... 17196123

(51) Int. Cl.
*G05D 1/00* (2006.01)
*G05D 1/02* (2020.01)
(Continued)

(52) U.S. Cl.
CPC ....... *G05D 1/0255* (2013.01); *B62D 15/0285* (2013.01); *G01S 5/18* (2013.01);
(Continued)

(58) Field of Classification Search
USPC ......................................................... 701/12
See application file for complete search history.

(56) References Cited

U.S. PATENT DOCUMENTS

| 5,491,670 A | 2/1996 | Weber |
| 2003/0142587 A1 | 7/2003 | Zeitzew |

(Continued)

FOREIGN PATENT DOCUMENTS

| DE | 2014221768 A1 | 4/2016 |
| DE | 2014221777 A1 | 4/2016 |

(Continued)

OTHER PUBLICATIONS

Feb. 28, 2018 European Search Report issue on International Application No. 17196123.8.

*Primary Examiner* — James M McPherson
(74) *Attorney, Agent, or Firm* — Clements Bernard Walker; Christopher L. Bernard

(57) ABSTRACT

A method and system for guiding a self-driving vehicle. The vehicle comprises an ultrasound-based proximity sensing system. The method comprises determining a location and an orientation of the vehicle in a predetermined coordinate system; in the vehicle, receiving a predetermined route from the traffic control unit; by a vehicle control unit, controlling the vehicle to travel along the predetermined route while estimating a vehicle travel path; receiving an ultrasound signal from a beacon having a known location in the predetermined coordinate system, wherein the ultrasound signal transmitted by the beacon uniquely identifies the beacon location; determining a relative position of the vehicle in relation to the beacon by means of ultrasound signals transmitted between the beacon and the vehicle; and determining a location of the vehicle in the predetermined coordinate system based on the determined relative position of the vehicle and the known location of the beacon.

11 Claims, 5 Drawing Sheets

(51) Int. Cl.
  *G01S 11/14* (2006.01)
  *B62D 15/02* (2006.01)
  *G01S 5/18* (2006.01)

(52) U.S. Cl.
  CPC ............ *G01S 11/14* (2013.01); *G05D 1/0088* (2013.01); *G05D 1/0276* (2013.01); *G05D 2201/0213* (2013.01)

(56) References Cited

U.S. PATENT DOCUMENTS

| | | | |
|---|---|---|---|
| 2017/0008521 A1* | 1/2017 | Braunstein | G01C 21/3407 |
| 2017/0038777 A1 | 2/2017 | Harvey | |
| 2018/0024562 A1* | 1/2018 | Bellaiche | B60W 30/12 |
| | | | 701/26 |
| 2018/0075309 A1* | 3/2018 | Sathyanarayana | G06N 7/005 |
| 2018/0137454 A1* | 5/2018 | Kulkarni | G08G 5/0069 |
| 2018/0231979 A1* | 8/2018 | Miller | G06Q 30/0266 |
| 2018/0336782 A1* | 11/2018 | Chase | G05D 1/0088 |
| 2019/0043358 A1* | 2/2019 | Biehle | G08G 1/0965 |
| 2019/0384294 A1* | 12/2019 | Shashua | G05D 1/0246 |

FOREIGN PATENT DOCUMENTS

| | | |
|---|---|---|
| DE | 102014221768 A1 | 4/2016 |
| DE | 102014221777 A1 | 4/2016 |
| DE | 2015212332 A1 | 1/2017 |
| DE | 102015212332 A1 | 1/2017 |

* cited by examiner

METHOD AND SYSTEM FOR GUIDING AN AUTONOMOUS VEHICLE

CROSS-REFERENCE TO RELATED APPLICATION

The present patent application/patent claims the benefit of priority of co-pending European Patent Application No. 17196123.8, filed on Oct. 12, 2017, and entitled "METHOD AND SYSTEM FOR GUIDING AN AUTONOMOUS VEHICLE," the contents of which are incorporated in full by reference herein.

FIELD OF THE INVENTION

The present invention relates to a method and system for guiding an autonomous vehicle. In particular, the present invention relates to a method and system for guiding an autonomous vehicle using an ultrasound based system.

BACKGROUND OF THE INVENTION

With the increasing availability of vehicle features enabling autonomous driving, more and more possible applications arise where it is desirable to move vehicles autonomously in a remote controlled manner.

It may for example be desirable to extend the automated parking functionality of a vehicle beyond merely park-in and park-out maneuvers. A vehicle may for example be automatically brought to a driver from a parking space in a parking garage, or it may be parked automatically when left at the parking garage entrance. This can be seen as automated concierge/valet parking.

However, fully automated driving requires that the vehicle is capable of knowing and controlling the vehicle location as well as being able to detect objects and identify potential obstacles.

GPS is a well known positioning system, with equally well known limitations. An on-board GPS-unit is for example not capable of determining the vehicle position with sufficient accuracy for a robust autonomous driving solution without the aid of additional support systems, requiring additional vehicle functionality or external infrastructure.

Moreover, a vehicle GPS-unit cannot be used indoors since there must be a connection to GPS-satellites.

Accordingly, there is a need for improved methods and systems for guiding a vehicle in an autonomous manner.

SUMMARY OF THE INVENTION

In view of above-mentioned and other drawbacks of the prior art, it is an object of the present invention to provide a method and a system for guiding a self-driving vehicle.

According to a first aspect of the invention, there is provided a method for guiding a self-driving vehicle. The vehicle comprises an ultrasound-based proximity sensing system comprising a plurality of ultrasound sensors and a communication device for communication with a traffic control unit. The method comprises determining a location and an orientation of the vehicle in a predetermined coordinate system; in the vehicle, receiving a predetermined route from the traffic control unit; by a vehicle control unit, controlling the vehicle to travel along the predetermined route while estimating a vehicle travel path; receiving an ultrasound signal from a beacon having a known location in the predetermined coordinate system, wherein the ultrasound signal transmitted by the beacon uniquely identifies the beacon; determining a relative position of the vehicle in relation to the beacon by means of ultrasound signals transmitted between the beacon and the vehicle; and determining a location of the vehicle in the predetermined coordinate system based on the determined relative position of the vehicle and the known location of the beacon.

A self driving vehicle should in the present context be seen as a vehicle which is capable of driving without any input of a driver, and without the need for a driver in the driver seat. Many vehicles already has this functionality today, but are being prevented from autonomous operation for safety reasons. Accordingly, the described method may be used in an enclosed area where autonomous operation of the vehicle can be allowed.

A self driving vehicle may also be referred to as an autonomous or a semi-autonomous vehicle.

The initial location of the vehicle can for example be determined by a GPS device in the vehicle. It is also possible that the traffic control system can establish the vehicle location by other means. The vehicle orientation can be acquired form a compass in the vehicle.

The predetermined coordinate system may in the present context be any suitable coordinate system, and it may be either a local or a global coordinate system. The coordinate system may for example have its origin at the starting point of the predetermined route or at any other known reference point.

That the ultrasound signal transmitted by the beacon uniquely identifies the beacon location means that the vehicle is able to establish a reference location of the beacon in the predetermined coordinate system based on information received from the beacon. The ultrasound signal may comprise a beacon identifier, where the vehicle already has knowledge of reference locations of beacons having a specific identity. It is also possible that the beacon transmits beacon location information to the vehicle, either by the ultrasound signal or by other means.

The present invention is based on the realization that a self driving vehicle can be guided along a predetermined route when aided by stationary beacons by using an ultrasound-based proximity sensing system of the vehicle. Since an ultrasound-based proximity sensing system is commonly available in many vehicles, a vehicle can be guided without the need for additional and more complex systems such as radar, LIDAR, camera based systems etc. and without the need for additional complex infrastructure external to the vehicle. This means that the described method is applicable for a wide range of vehicles at a relatively low cost. The method may advantageously be employed for driving a vehicle from a manufacturing line to the first parking space at the manufacturing site.

It can be assumed that the vehicle is not in itself capable of estimating a vehicle travel path with an accuracy that is sufficient to safely drive the vehicle along the entire predetermined route without any corrections from real time position measurements during the route. Accordingly, in order to be able to travel any significant distances, the vehicle position is preferably verified along the route and this can be done by establishing the relative position of the vehicle in relation to a fixed point having a known location in the predetermined coordinate system, i.e. the beacon. The beacon location in the predetermined coordinate system is thus known to the vehicle. Position determination using ultrasonic signals can be performed in different ways which are well known to the skilled person, and examples will be given in the following detailed description. The vehicle location in the coordinate system can then be calibrated using only the beacon.

According to one embodiment of the invention the method may further comprise controlling the vehicle to act as a beacon for a second vehicle. Since the vehicle can be assumed to comprise the ultrasonic transducers necessary for positioning and communication, the vehicle may also act as a beacon in the described system. This eliminates the need for specific beacon devices and also opens up for other possible uses of the described system. Accordingly, when the beacon is a stationary vehicle comprising an ultrasound-based proximity sensing system, the described method can be used in a parking lot where selected vehicles along the predetermined route are controlled to act as beacons. The described method can also be used to form a vehicle train where a first vehicle travels to a first point where it changes role to act as a beacon, a second vehicle follows, travels past the first vehicle, stops, and then acts as a beacon, and so on, until all vehicles have reached their final destinations.

According to one embodiment of the invention, the method may further comprise, in the vehicle, receiving beacon location information from the traffic control unit. The traffic control unit can thereby control the vehicle along the route and continuously provide beacon location information to the vehicle as needed. The traffic control unit can thereby be capable of communicating with the vehicle via an RF-communication channel continuously throughout the route. It is also possible for the traffic control unit to update and modify the route as the vehicle is driving, as well as temporarily halting and then resuming the driving of one or several vehicles, e. g. due to hazards or obstacles detected along the route. In an environment where many vehicles and many possible beacons are available, the traffic control unit advantageously control which vehicles should act as beacons in order to most efficiently guide the vehicle along the route.

According to one embodiment of the invention, the method may further comprise, in the vehicle, receiving beacon location information from the traffic control unit when receiving the predetermined route. In an embodiment where the location of all of the beacons along the predetermined route are known before the route is started, the vehicle can receive all necessary beacon location information from the traffic control unit before the vehicle starts to drive along the path.

According to one embodiment of the invention, the method may further comprise, in the vehicle, receiving beacon location information from the beacon via an RF-communication channel. Thereby, the vehicle does not have to rely on getting all of the required beacon location information from the traffic control unit. This potentially enables the vehicle to travel longer distances and to travel out of the communication range of the vehicle control unit.

According to one embodiment of the invention, estimating a travel path may comprise calculating a vehicle position using dead reckoning. By using e.g. an inertial measurement unit (IMU) or the like together with knowledge of vehicle driving parameter such as speed and steering angle, the vehicle can estimate the traveled path with reasonable accuracy using dead reckoning, which in turn increases the required distance between beacons. It should however be noted that the required distance between and location of beacons may be determined by a range of different parameters, such as the shape of the route, obstacles or hazards along the route etc.

According to one embodiment of the invention, estimating a travel path may comprise detecting road indicators having known locations in the predetermined coordinate system. The vehicle can thereby calibrate its position along the route aided by road indicators to thereby improve the vehicle travel path estimation. Such indicators may include bumps in the road, or if the vehicle is equipped with one or more cameras, visual indicators in the road or by the side of the road.

According to one embodiment of the invention, determining the relative position of the vehicle in relation to the beacon may be performed using a time of arrival model or a time difference of arrival model. Positioning, whether it is based on radio or ultrasonic signals, is often based on either of the two models named Time-Of-Arrival (TOA), or Time-Difference-Of-Arrival (TDOA). The high level difference between the two models is that TOA needs N, while TDOA needs N+1 receivers to resolve a position in N dimensions, and that TOA requires time synchronization between sender and receivers, while TDOA does not. Details of the two methods are well known and will not be discussed in further detail herein. It can be assumed that the vehicle has the required number of sensors to perform positioning according to the selected model, and that the vehicle and the beacon are capable of performing time synchronization if so required.

According to one embodiment of the invention, the method may further comprise controlling the proximity sensing system to act in a beacon detection mode where the proximity sensing system listens for beacon signals. A proximity sensing system typically operates based on a principle where ultrasonic signals are transmitted by transducers and where reflected signals are received and analyzed to determine properties of the vehicle surroundings and to detect object in the vicinity of the vehicle. In a beacon detection mode, the transducers are instead configured to listen for signals transmitted from the beacon. Once the beacon has been discovered, the proximity sensing system can be controlled to interact with the beacon according to a predetermined method in order to establish the relative position of the vehicle. The ultrasound signal transmitted from each beacon may advantageously be coded such that a beacon can be uniquely identified by the vehicle.

According to one embodiment of the invention, the method may further comprise multiplexing the proximity sensing system between a beacon detection mode and a proximity sensing mode. Thereby, the vehicle can listen for a beacon while at the same time utilizing the proximity sensing system for proximity sensing by switching the functionality of the transducers of the proximity sensing system between proximity sensing and beacon detection.

According to a second aspect of the invention, there is provided a traffic control system for controlling a self driving vehicle. The system comprises a traffic control unit configured to communicate with a vehicle; a vehicle comprising a vehicle control unit, an ultrasound-based proximity sensing system comprising a plurality of ultrasound sensors and a communication device configured to communicate with the traffic control unit; at least one beacon having a known location in a predetermined coordinate system. The traffic control unit is configured to: determine a location and an orientation of the vehicle in the predetermined coordinate system; transmit a predetermined route to the vehicle; and wherein the vehicle control unit is configured to: control the vehicle to travel along the predetermined route while estimating a vehicle travel path; receive an ultrasound signal from the beacon, wherein the ultrasound signal transmitted by the beacon uniquely identifies the beacon location; determine a relative position of the vehicle in relation to the beacon by means of ultrasound signals transmitted between the beacon and the vehicle; and determine a location of the vehicle in the predetermined coordinate system based on the determined relative position of the vehicle and the known location of the beacon.

According to one embodiment of the invention, the beacon may comprise a beacon RF-communication unit and the vehicle comprises a vehicle RF-communication unit, and wherein the beacon is configured to transmit beacon location information to the vehicle via an RF-communication channel. The RF-communication units may for example be WiFi devices, Bluetooth devices or the like.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a traffic control system and a method for guiding a self-driving vehicle using the traffic control system where the vehicle is a car. However, various embodiments of the described method and system are equally applicable to other vehicles such as trucks, buses and the like.

Figure 1:
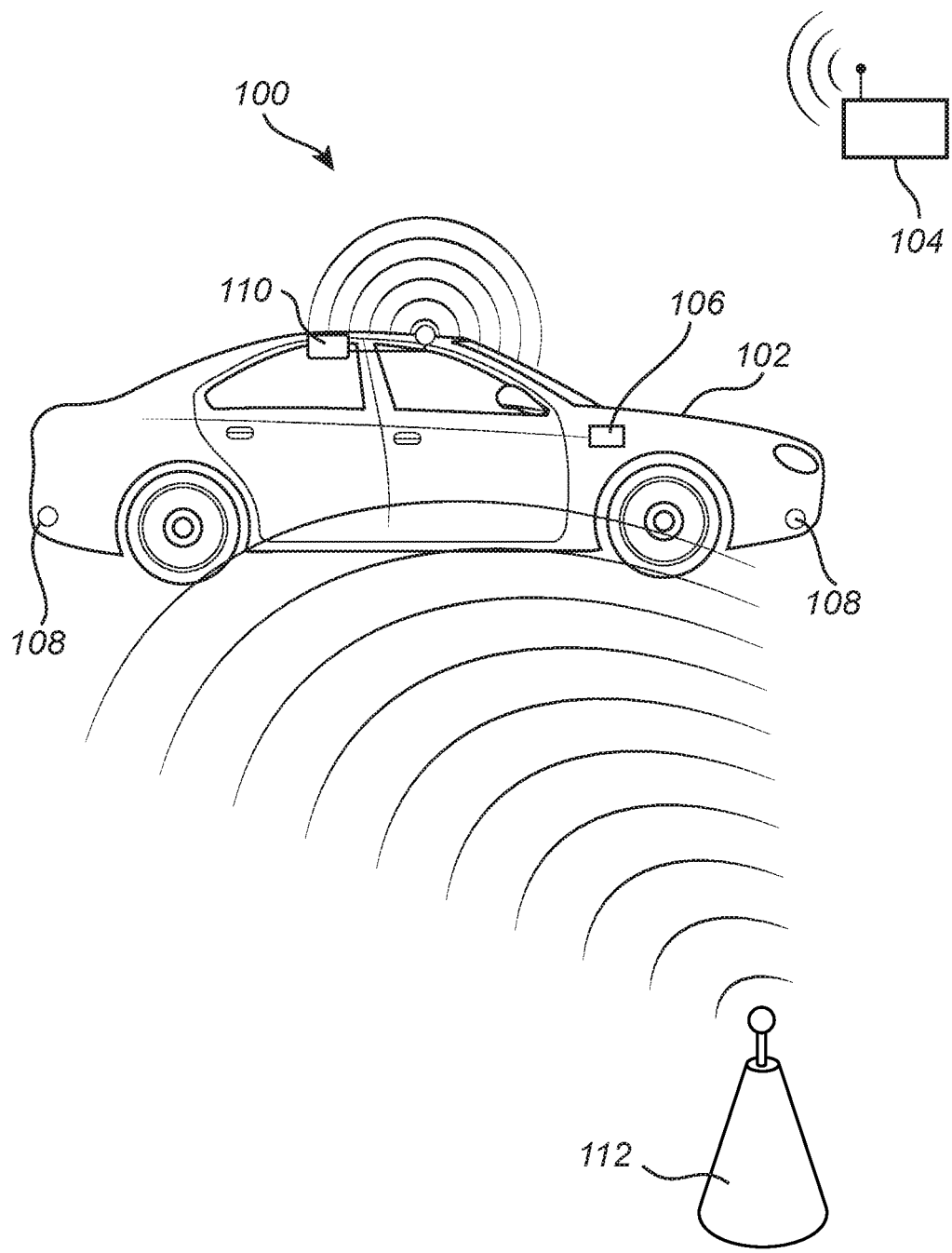
FIG. 1 schematically illustrates a traffic control system according to an embodiment of the invention.

FIG. 1 schematically illustrates a traffic control system 100 for controlling a self driving vehicle 102 according to an embodiment of the invention. Then, the system 100 comprises a traffic control unit 104 configured to communicate with the vehicle 102 via a wireless RF-communication channel such as WiFi or Bluetooth. The vehicle 102 comprises a vehicle control unit 106, an ultrasound-based proximity sensing system comprising a plurality of ultrasound sensors 108 and a communication device 110 configured to communicate with the traffic control unit 104 via the wireless RF-communication channel. Ultrasound sensors 108 are often provided in the form of ultrasonic transducers capable of both transmission and reception of ultrasonic signals. However, it is also possible to provide an ultrasound sensor 108 consisting of separate transmitter and receiver units. The ultrasound sensors 108 are here illustrated as being located at or near the corners of the vehicle 102. In a proximity sensing system, it is preferable that the sensors 108 are arranged so that it is possible to detect objects on all sides of the vehicle. Moreover, for accurate position determination of the vehicle 102 in relation to the beacon 112, two separate sensors 108 must be able to receive a signal transmitted by the beacon 112 and the separation distance between the two sensors 108 must be sufficiently large so that two separate paths between the beacon 112 and the respective sensor 108 can be identified. This can for example be achieved by placing one sensor 108 in each corner of the vehicle as illustrated in FIG. 1, assuming that the sensor 108 has a horizontal directional sensitivity of at least 270°. It is of course possible to achieve the same area coverage with a larger number of sensors 108 located on respective sides of the vehicle 102.

The system 100 further comprises at least one beacon 112 having a known location in the predetermined coordinate system.

The control units 104, 106 may include a microprocessor, microcontroller, programmable digital signal processor or another programmable device. The control units 104, 106 may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Moreover, the vehicle control unit 106 may be a general purpose control unit of the vehicle 102, or it may be a dedicated control unit specifically configured to control the vehicle guiding and proximity sensing system.

Figure 2:
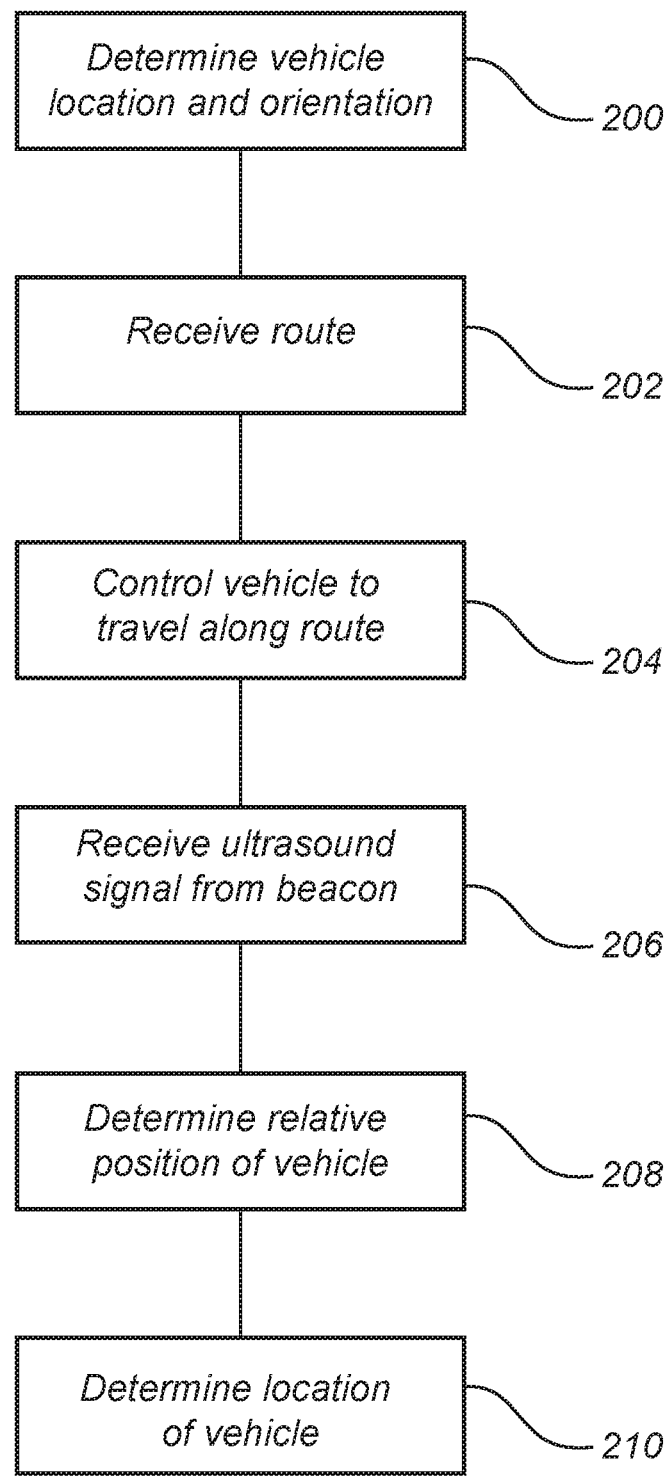
FIG. 2 is a flow chart outlining general steps of a method according to an embodiment of the invention.
Figure 3:
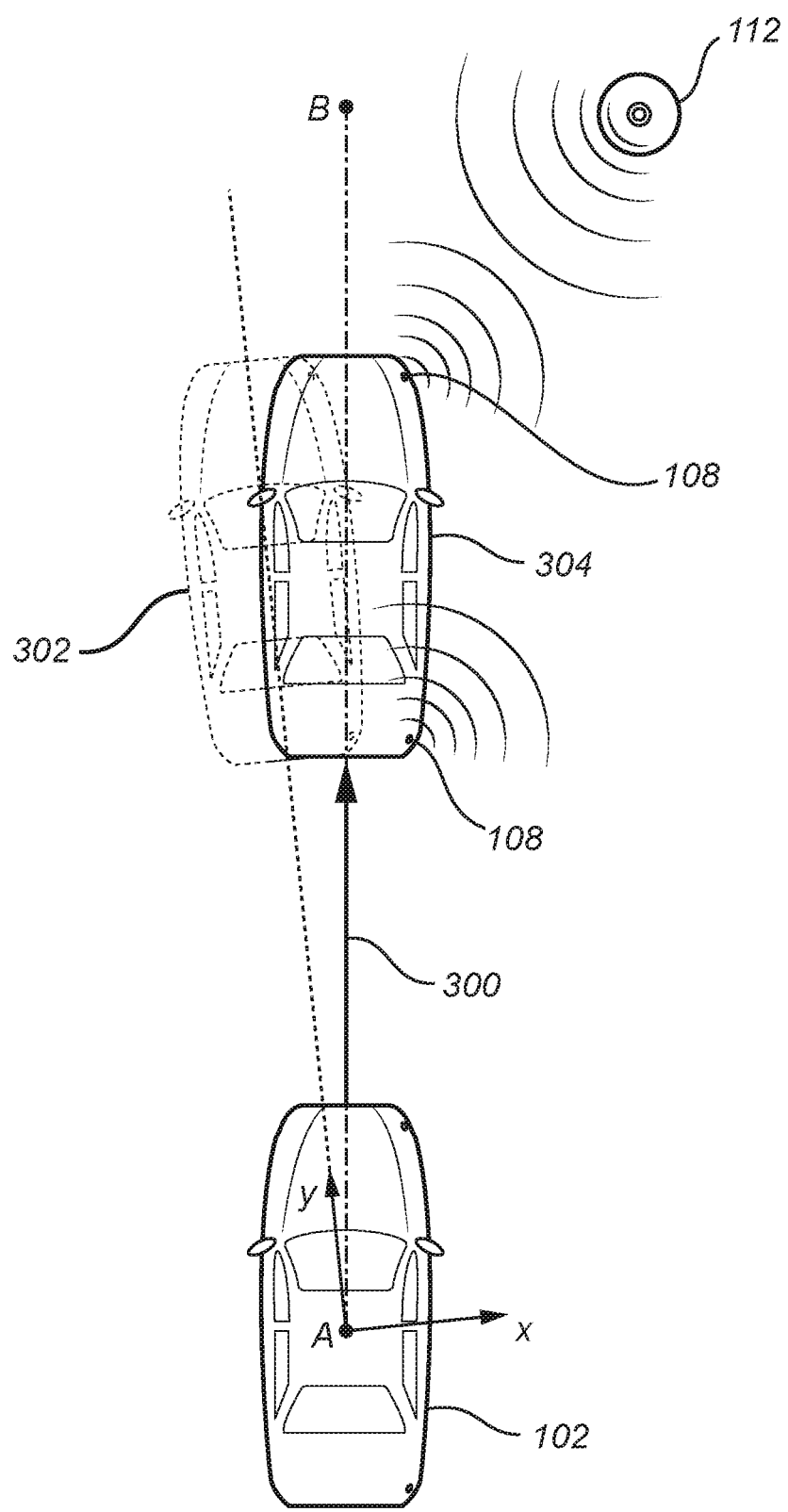
FIG. 3 schematically illustrates a method according to an embodiment of the invention.

FIG. 2 is a flow chart outlining the general steps of a method according to an embodiment of the invention. The method will be described with further reference to FIG. 3 schematically illustrating various steps of the method.

First, a location and an orientation of the vehicle 102 is determined 200 in a predetermined coordinate system. The predetermined coordinate system is here illustrated as a conventional two dimensional xy-coordinate system. However, any known coordinate system may be used. The vehicle position and orientation may be determined in the vehicle 102 using e.g. GPS and a compass and subsequently provided by the vehicle 102 to the traffic control system 100 via the communication device 110 of the vehicle 102. It is also possible that the traffic control system 100 receives a command from an operator indicating that the vehicle 102 is in a specified location and having a known orientation. The traffic control system 100 may also include cameras or other sensors for determining a vehicle location and orientation.

The traffic control system 100 may also communicate with and be controlled by an overarching logistics system which is hierarchically arranged such that the logistics system determines the start and end points of the route for one or more vehicles 102 while the traffic control system 100 determines the actual route in the predetermined coordinate system and controls the vehicle 102 to travel the determined route. It is thus assumed that the traffic control unit 104 has sufficient knowledge of the geography and layout of the area between the start point and end point to be able to determine a suitable route. The route may be defined by a series of coordinate points, by vectors or by any other suitable route representation.

Once the vehicle location and orientation is determined 200 and the route is established by the traffic control unit 104, the vehicle 102 receives 202 the predetermined route from the traffic control unit 104. The information provided by the traffic control unit 104 to the vehicle 102 may include information of beacon locations along the route, with beacon locations defined in the predetermined coordinate system.

The vehicle control unit 106 will then control 204 the vehicle to travel along the predetermined route while estimating a vehicle travel path e.g. by dead reckoning.

As the vehicle 102 is travelling along the route, it will eventually receive 206 an ultrasound signal from a beacon 112, wherein the ultrasound signal transmitted by the beacon 112 and received by the vehicle 102 uniquely identifies the beacon location either by identifying the beacon 102 as a beacon 102 known to the vehicle or by transmitting location information as part of the ultrasound signal. It is also possible that the vehicle 102 receives information describing the beacon location by means of an RF-communication channel established between the vehicle 102 and the beacon 112. In embodiments where the beacon 112 is a stationary vehicle 102, such a communication interface may already be established. The ultrasound signal transmitted by the beacon 112 can be assumed to have an effective range of approximately 20 to 30 m, and a clear line of sight is in principle required.

In an embodiment where the beacon 112 and the vehicle 102 both comprise RF-communication units, RF-communication between the vehicle 102 and the beacon 112 may be used to establish when the vehicle 102 is within ultrasound range of a beacon 112. Thereby, the beacon 112 can estimate when the vehicle 102 is within range of the beacon 112 and when the beacon 112 should start to transmit ultrasound signals, and the vehicle 102 can determine when it should start to listen for ultrasound signals transmitted by the beacon 112. Thereby, a more power efficient system can be provided since the beacon 112 only needs to transmit signal when a vehicle 102 is in range of the beacon 112. This is particularly advantageous if the beacon 112 is another vehicle.

Next, a relative position of the vehicle 102 in relation to the beacon 112 is determined 208 by means of ultrasound signals transmitted from the beacon 112 to the vehicle 102 using e.g. a time of arrival- or time difference of arrival-method. The position of the vehicle in relation to the beacon 112 is determined in at least two dimensions in the predetermined coordinate system since it is not sufficient to only determine the distance between the beacon and one sensor 108 to accurately determine the relative position of the vehicle 102. The accuracy of the position determination can be assumed to be below 10 cm, and preferably in the range of 3 to 5 cm, which is sufficiently accurate for the described implementation. It is also assumed that the precise location of each sensor 108 in relation to the vehicle 102 as a whole is well known with high precision.

In the present description, the relative position of the vehicle 102 is determined by transmitting an ultrasound signal from the beacon 112 that is subsequently received by at least two ultrasound receivers 108 in the vehicle 102. It is also possible to determine the position of the vehicle 102 by means of methods using bi-directional communication of ultrasound signals between the beacon 112 and the vehicle 102.

Finally, a location of the vehicle 102 in the predetermined coordinate system can be determined 210 based on the determined relative position of the vehicle 102 and the known location of the beacon 112 in the predetermined coordinate system. The measured location of the vehicle 102 is then compared with a current vehicle location as estimated by the vehicle 102 and used in the route travel control, and if a difference between the current estimated vehicle location and the measured vehicle location is larger than a predetermined limit, the vehicle location used by the vehicle 102 is adjusted to correspond to the determined vehicle location.

FIG. 3 schematically illustrates a simplified example where a route 300 simply is a straight line from point A to point B. Here it is illustrated that an estimated vehicle location 302 may deviate from the actual vehicle location 304, which may be a result of errors in dead reckoning calculations. The vehicle location can thereby be corrected before the route continues. It is also possible to determine the location of the vehicle 102 as the vehicle 102 is moving as long as the vehicle speed is not too high, such as below 10 km/h. It is also possible to take a current vehicle speed into account when determining the relative vehicle location.

Figure 4:
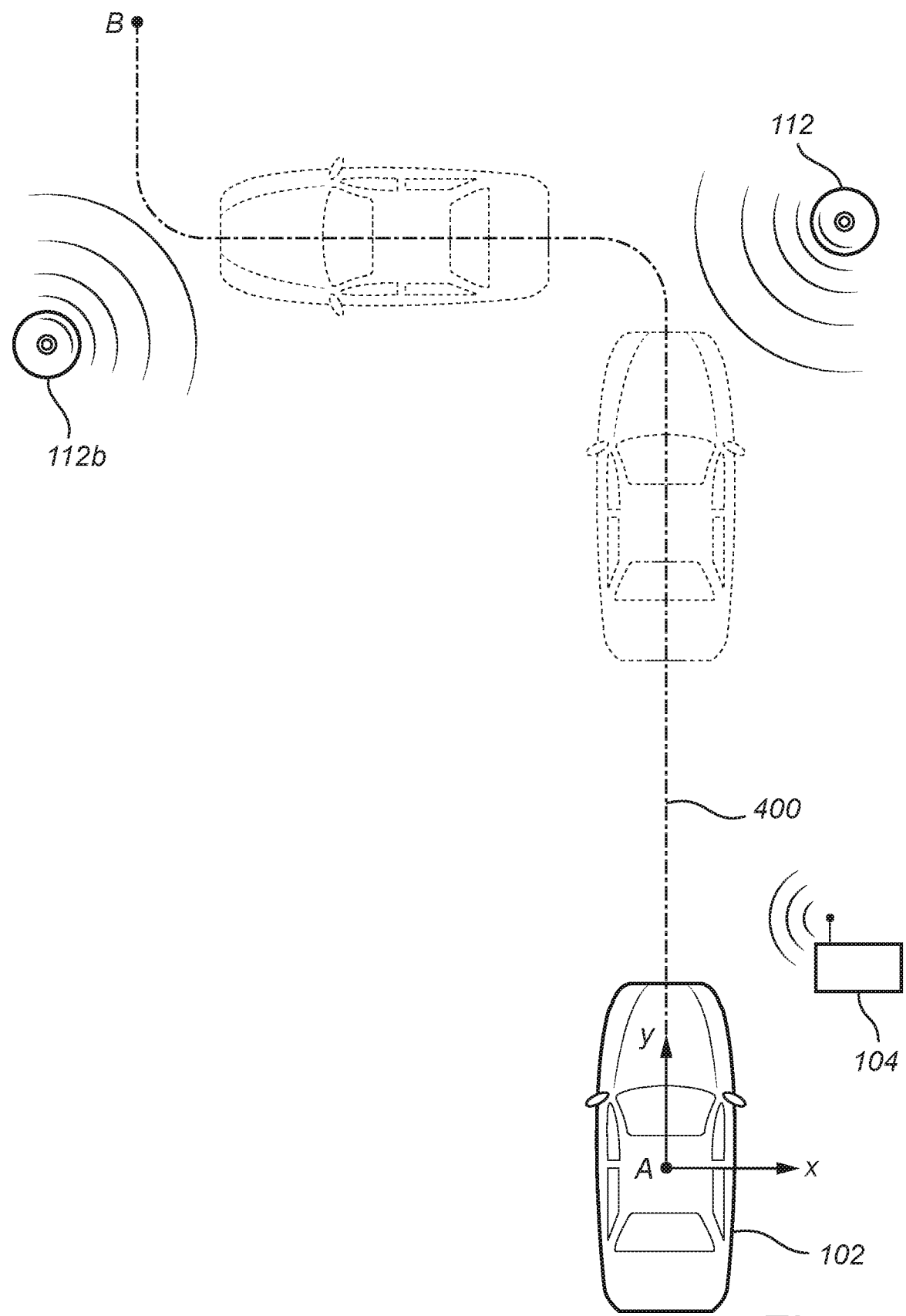
FIG. 4 schematically illustrates a method according to an embodiment of the invention.

In FIG. 4 a route 400 is illustrated where the vehicle interacts with a first beacon 112a and a second beacon 112b along the route from point A to point B. In environments where a high accuracy is required, the beacons 112a-b can be arranged such that the vehicle 102 is always within range of a beacon 102 along the entire route. The required position of beacons 112 for a given route may be determined by the traffic control system 100 or by a logistics system. Moreover, the traffic control unit 104 may be configured to communicate with vehicle 102 during the route to receive information on deviations from the route or unexpected obstacles. The traffic control unit 104 preferably also has the capability to transmit an emergency stop signal to the vehicle.

Figure 5:
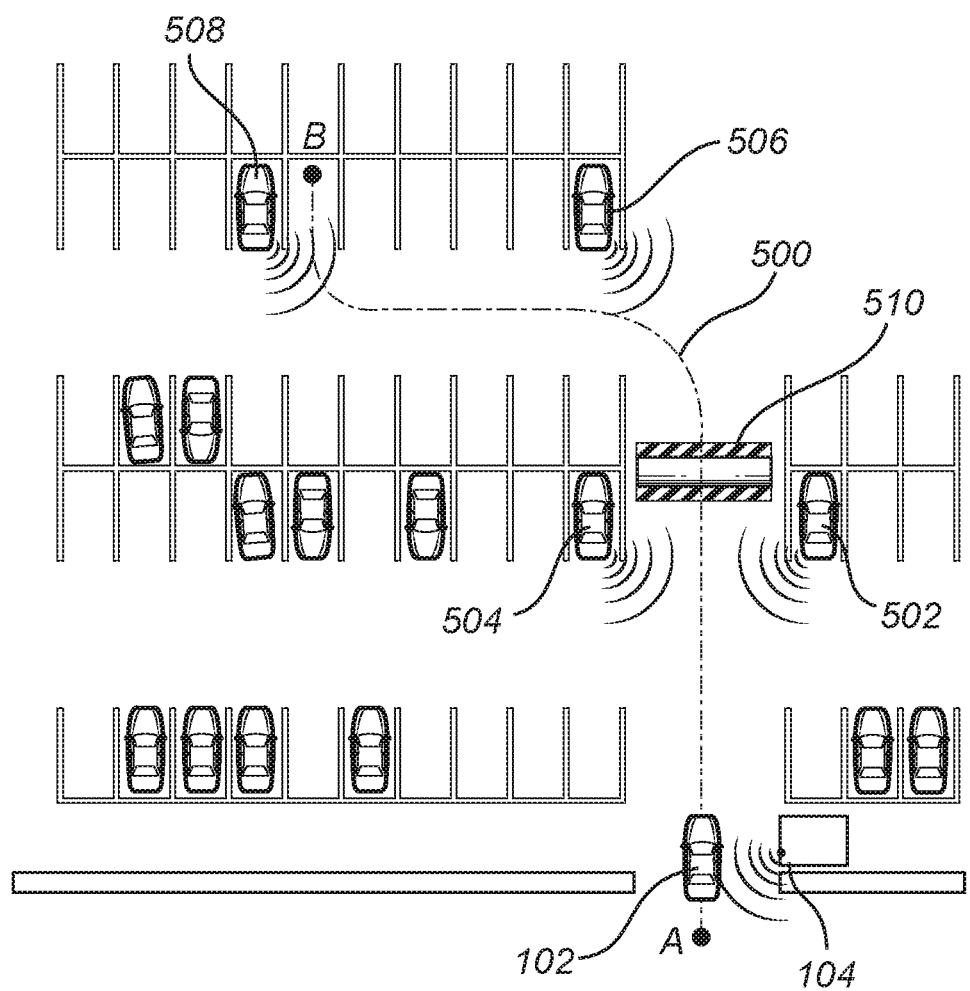
FIG. 5 schematically illustrates a method according to an embodiment of the invention.

FIG. 5 schematically illustrates an embodiment of the invention where the vehicle 102 is to be guided from a starting location A at the entrance of a parking lot to the final location B, which is a selected parking space. Here, parked vehicles 502, 504, 506, 508 act as stationary beacons along the route. The route further comprises an indicator in the form of a bump 510. It is assumed that the vehicle 102 knows the location of the bump 510 in the predetermined coordinate system and the vehicle 102 can thereby calibrate its position when the bump 510 is detected in the vehicle 102.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A method for guiding a self-driving vehicle:
   the vehicle comprising an ultrasound-based proximity sensing system comprising a plurality of ultrasound sensors and a communication device for communication with a traffic control unit;
   the method comprising:

determining a location and an orientation of the vehicle in a predetermined coordinate system;

in the vehicle, receiving a predetermined route from the traffic control unit;

by a vehicle control unit, controlling the vehicle to travel along the predetermined route while estimating a vehicle travel path;

receiving an ultrasound signal from a beacon having a known location in the predetermined coordinate system, wherein the ultrasound signal transmitted by the beacon uniquely identifies the beacon having the known location;

determining a relative position of the vehicle in relation to the beacon by means of ultrasound signals transmitted between the beacon and the vehicle;

determining a location of the vehicle in the predetermined coordinate system based on the determined relative position of the vehicle and the beacon having the known location; and controlling the vehicle to act as a stationary ultrasound beacon for a second vehicle.

2. The method according to claim 1, wherein the beacon is a stationary vehicle comprising an ultrasound-based proximity sensing system.

3. The method according to claim 2, further comprising controlling a vehicle defined as a beacon to instead be defined as a vehicle in a traffic control system.

4. The method according to claim 1, further comprising, in the vehicle, receiving a location of all beacons along the predetermined route from the traffic control unit.

5. The method according to claim 4, wherein the location of all beacons along the predetermined route is received when receiving the predetermined route.

6. The method according to claim 1, further comprising, in the vehicle, receiving beacon location information from the beacon via an RF-communication channel.

7. The method according to claim 1, wherein estimating a travel path comprises calculating a vehicle position using dead reckoning.

8. The method according to claim 1, wherein estimating a travel path comprises detecting road indicators having known locations in the predetermined coordinate system.

9. The method according to claim 1, wherein determining the relative position of the vehicle in relation to the beacon is performed using a time of arrival model or a time difference of arrival model.

10. The method according to claim 1, further comprising controlling the ultrasound-based proximity sensing system to act in a beacon detection mode where the ultrasound-based proximity sensing system listens for beacon signals.

11. The method according to claim 1, further comprising switching the ultrasound-based proximity sensing system between a beacon detection mode and a proximity sensing mode.

* * * * *